United States Patent [19]

Boehly et al.

[11] 3,742,139

[45] June 26, 1973

[54] FRAMING SYSTEM FOR T-CARRIER TELEPHONY

[76] Inventors: Michael A. Boehly, 35 Nory Lane, Rochester, N.Y. 14606; Paul K. Kavanaugh, 528 Countryside Lane, Webster, N.Y. 14580

[22] Filed: Jan. 20, 1971

[21] Appl. No.: 108,005

[52] U.S. Cl. .......... 178/69.5 R

[51] Int. Cl. .......... H04l 7/00

[58] Field of Search .......... 178/69.5 R; 179/15 BS, 15 BA; 328/63, 72; 307/269

[56] References Cited

UNITED STATES PATENTS

| | | | |
|---|---|---|---|
| 3,317,669 | 5/1967 | Ohnsorge | 179/15 BS |
| 3,127,475 | 3/1964 | Coulter | 179/15 BS |
| 3,591,720 | 7/1971 | Othmer | 178/69.5 |

*Primary Examiner*—Robert L. Richardson

*Attorney*—Hoffman Stone and Charles C. Krawczyk

[57] ABSTRACT

A framing system for the receiver in a T-carrier system of the kind in which framing signals are transmitted only in alternate frames. A group of eight time slots is fed to a store and compared with the corresponding eight time slots two frames later. If there is no framing relationship, the circuit steps to the next succeeding group of eight time slots and repeats the comparison. If the timing relationship is found, further comparisons are made at intervals of two frames each. If the framing relationship persists, the receiver is synchronized, if not, the circuit steps to the next group of eight time slots. The process is iterative until the framing relationship is found. A half adder controls a pair of eight stage shift registers to detect candidate time slots and framing.

3 Claims, 2 Drawing Figures

| SEQUENCE OF FRAMING PULSES | |
|---|---|
| FRAME | VALUE |
| 1 | 1 |
| 2 | NOT SENSED |
| 3 | 0 |
| 4 | NOT SENSED |
| 5 | 1 |
| 6 | NOT SENSED |
| 7 | 0 |
| 8 | NOT SENSED |

INVENTORS
PAUL K. KAVANAUGH
MICHAEL A. BOEHLY
BY Hoffman Stone
ATTORNEY

FRAMING SYSTEM FOR T-CARRIER TELEPHONY

BRIEF DESCRIPTION

This invention relates to a frame synchronizing system for the receiver in a T-carrier system of the kind in which the framing information is carried, or transmitted only in alternate frames, and, more particularly, to a novel system of this kind capable of rapid operation and of re-synchronizing the receiver in the event of accidental loss of framing quickly enough to avoid dropping of the switch train due to momentary loss of synchronization.

T-carrier systems are well known and are coming into fairly wide use. As originally proposed, the system was based on a 125 microsecond time frame consisting of 193 time slots, the last of which was designated a framing time slot. Framing signals were transmitted in the last time slot of each frame and consisted of alternate pulse and no-pulse signals (binary ones alternating with zeroes). Synchronizing the receiver was a fairly simple matter.

It was recognized that the early T-carrier system included excessive redundancy in the transmission of supervisory signals, and the system has been modified to improve the quality of voice signal transmission by reducing the redundancy. In the modified system the frame synchronizing signal is slower than in the original system. It still consists of alternate ones and zeroes, but they are transmitted only in alternate frames. If a framing one is transmitted in the first frame, for example, the last time slot of the second frame is ignored and the succeeding zero is transmitted in the third frame. The repetition rate of the framing pulses in the old system was 4 KHz.; in the newer system it is 2 KHz.

Although the synchronizing signal is now at only one-half the rate it used to be, it is still desired to achieve positive frame synchronization within approximately the same maximum time as in the older system to minimize the possibility of dropping of the switch train in the event of momentary loss of synchronization.

Briefly, in accordance with the present invention, the incoming signal is tested by making successive comparisons between signals in an arbitrarily selected series of eight consecutive time slots in a series of five frames spaced at the two-frame intervals. If the framing sequence of alternate ones and zeroes is found, the receiver is synchronized; if not, the circuit steps to the next series of eight consecutive time slots and repeats the comparison. The process is repeated until the framing sequence is found. By extending the comparison through eight consecutive time frames, the system operates to indicate frame synchronization only when a sequence of five signals is found that conform to the framing sequence and there is very little or no chance of false synchronization.

The comparison is achieved by storing signals from the selected eight time slots in an eight bit store, feeding the next set of eight bits together with the content of the store to an exclusive OR gate, and applying the output of the exclusive OR gate to a half adder circuit. The half adder circuit drives a pair of shift registers to produce an output signal when the framing sequence is found in one of the selected time slots.

DETAILED DESCRIPTION

Figures 1, 2:
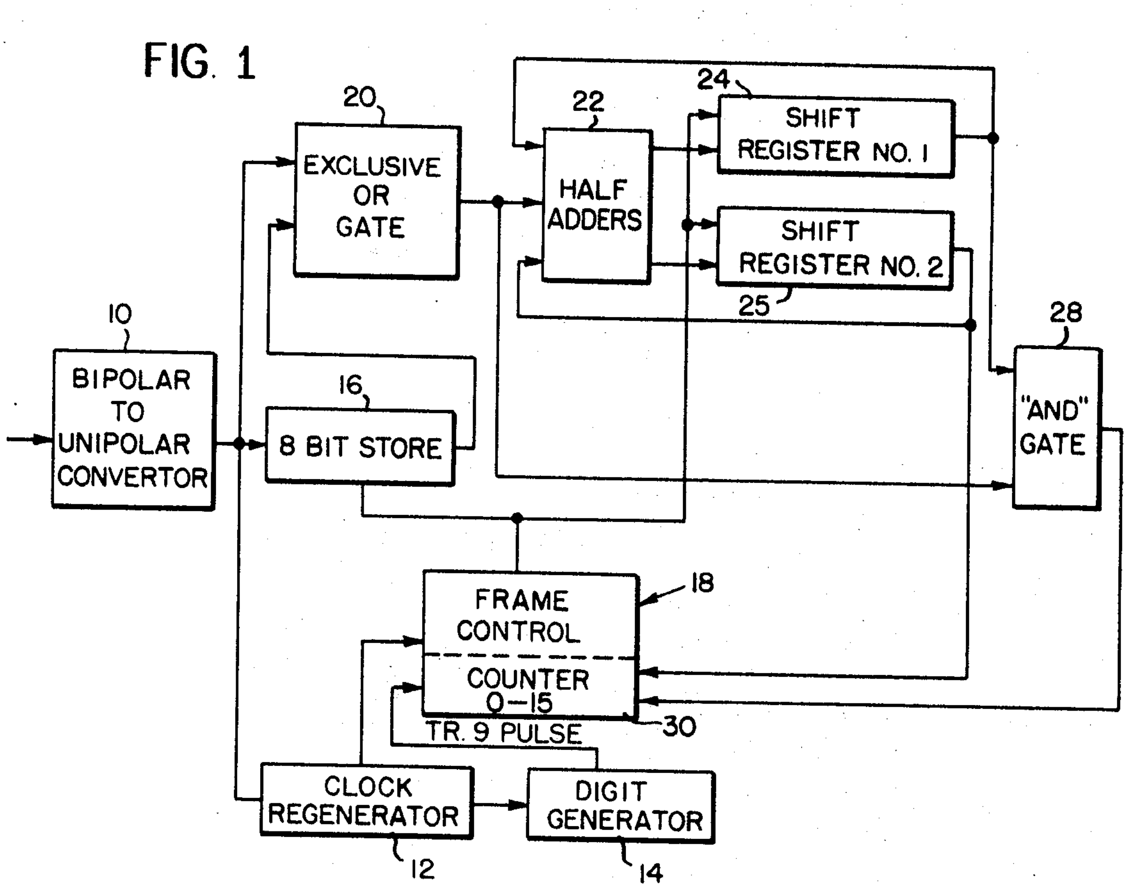

A presently preferred embodiment of the invention will now be descirbed in connection with the accompanying drawing wherein:

FIG. 1 is a block diagram of a framing circuit according to the invention; and FIG. 2 is a chart illustrating the sequence of framing signals transmitted in the modified T-carrier system.

The pulse train arriving at the receiver is in the form of bipolar pulses, that is, alternately positive going and negative going pulses, and it is converted at the receiver to unipolar form by a converter 10 for decoding. The unipolar pulse stream is applied to the framing circuit of the invention and received by a clock regenerator 12, which produces a clock signal at the pulse repetition rate of the incoming signal, typically 1.544 MHz. and locked in phase with the incoming pulse train. The output of the clock regenerator 12 is applied to a digit generator 14 to produce timing signals in accordance with the timing sequence of the system. The timing signal of concern in the practice of the invention is a pulse denoted TR 9, which occurs in a single time slot at a designated output terminal of the digit generator 14 at intervals equal to the duration of a single frame.

The balance of the circuit may be most readily understood by reference to its operation, starting at an arbitrarily selected frame designated the first frame and noting the framing sequence indicated in FIG. 2. An eight bit store 16 driven by a frame control circuit 18 is opened at an arbitrarily selected time during the first frame to receive signals in a series of eight successive time slots from the converter 10. The signals are kept in the store 16 for an interval of two frames and then fed to one input of an EXCLUSIVE OR gate 20, which compares them with the signals in the corresponding time slots of the third frame and produces an output pulse in each time slot where a signal in the first frame is different from the signal in the third frame. Simultaneously, the signals in the selected series of eight time slots in the third frame are inserted into the store 16.

The eight bit store 16 and the exclusive OR gate 20 thus operate to compare the signals in eight time slots of the first frame with the signals in the same time slots of the third frame, the third frame with the fifth, the fifth with the seventh, the seventh with the ninth, and so on, in each case comparing corresponding time slots. If framing is not achieved after the comparison between the seventh and ninth frames, the frame control circuit 18 operates to delay the opening of the store 16 by eight time slots, and another series of comparisons is carried out, this time directed to the series of eight time slots immediately following the eight time slots in the first comparison. The process is repeated until framing is achieved.

Framing is sensed by applying the output of the exclusive OR gate 20 to a half adder 22 circuit, the outputs of which are fed to first and second shift registers 24 and 25, respectively, each of which has eight stages. The outputs of the shift registers 24 and 25 and of the exclusive OR gate 20 are applied both to the half adder 22 circuit and to respective input terminals of an AND gate 28, the output of which inhibits the stepping of the frame control circuit 18 and thus establishes framing.

Assuming, for example, that the transmitted framing signal is in the series of eight time slots being compared during a given interval, the exclusive OR gate 20 will produce an output pulse during the first comparison, that is, during the third frame, and the half adder 22 circuit will insert a pulse into the first shift register 24 in response to it. Another output pulse from the exclusive OR gate 20 during the second comparison (the fifth frame) causes the half adder 22 circuit to erase the pulse previously inserted in the first shift register 24 and insert a pulse in the second shift register 25. The exclusive OR gate 20 produces a third output pulse during the third comparison (the seventh frame) causing the half adder 22 circuit to insert a new pulse in the first shift register 24 without disturbing the pulse in the second shift register 25. When the fourth pulse appears at the exclusive OR gate 20 during the ninth frame, the AND gate 28 becomes fully enabled and produces the frame identification signal, which may be used as desired in the frame control circuit 18 to synchronize the receiver.

The frame identifying signal at the output of the AND gate 28 is also applied to the frame control to inhibit stepping, thereby to insure that the same group of eight time slots are compared in all succeeding frames so long as synchronization is maintained.

The frame control 18 includes a 0–15 counter 30 which controls its operation. The TR 9 pulses from the digit generator 14 are applied to and counted by the counter 30, which is arranged to reset itself at the count of nine and to produce an output pulse at that time to inhibit the opening of the eight bit store 16 for a period equal to eight time slots. The output of the AND gate 28 is applied to the counter 30 to force it to the count of fifteen in response to an output pulse from the AND gate 28, skipping the count of nine and thereby causing the frame control 18 to remain "locked" on the same eight time slots repeatedly so long as the receiver is in frame.

To reduce the overall time required for framing after the receiver has gone out of synchronization, the output of the second shift register 25 is also fed to the counter 30 to reset it at the count of six if there is no pulse in the shift register 25 during the count of six, that is, if no candidate time slot has been found after the third comparison. Thus, if after the third comparison, there is no indication that the framing information may be in the eight time slots selected, the frame control inhibits opening of the eight bit store 16 for eight time slots and a new group of eight time slots is selected for comparison.

This arrangement achieves re-synchronization within a maximum average time of less than 51 milliseconds.

What is claimed is:

1. A framing circuit for synchronizing a receiver in a pulse code modulated signal transmission system of the T-carrier type in which framing information is transmitted only in alternate successive frames comprising:

a. a store for storing eight successive bits,
b. means for gating said store open for eight successive time slots at intervals of two frames,
c. means for applying incoming signals to said store,
d. an exclusive OR gate arranged to receive the incoming signals and the output of said store and to produce a candidate signal whenever the incoming signal is different from the output of said store,
e. a half adder circuit,
f. a pair of eight bit shift registers driven by said half adder circuit,
g. the outputs of said exclusive OR gate and of said shift registers being connected to the inputs of said half adder circuit, and
h. an AND gate arranged to produce an output signal whenever said exclusive OR gate and said shift registers produce output signals simultaneously.

2. A framing circuit according to claim 1 including a counter for counting frames and producing a reset signal at intervals of nine frames, and means for inhibiting said gating means for an interval equal to eight time slots in response to a reset signal produced by said counter, the output of said AND gate being applied to said counter to inhibit the production of the reset signal when said AND gate produces an output signal.

3. A framing circuit according to claim 2, the output of one of said shift registers being applied to said counter to cause it to produce a reset signal at the count of six if there is no signal in said one shift register when the counter reaches the count of six.

* * * * *